Feb. 6, 1962 B. V. ELLIOTT 3,020,388
AUTOMATIC WELDING MACHINE
Filed Dec. 7, 1956 5 Sheets-Sheet 1
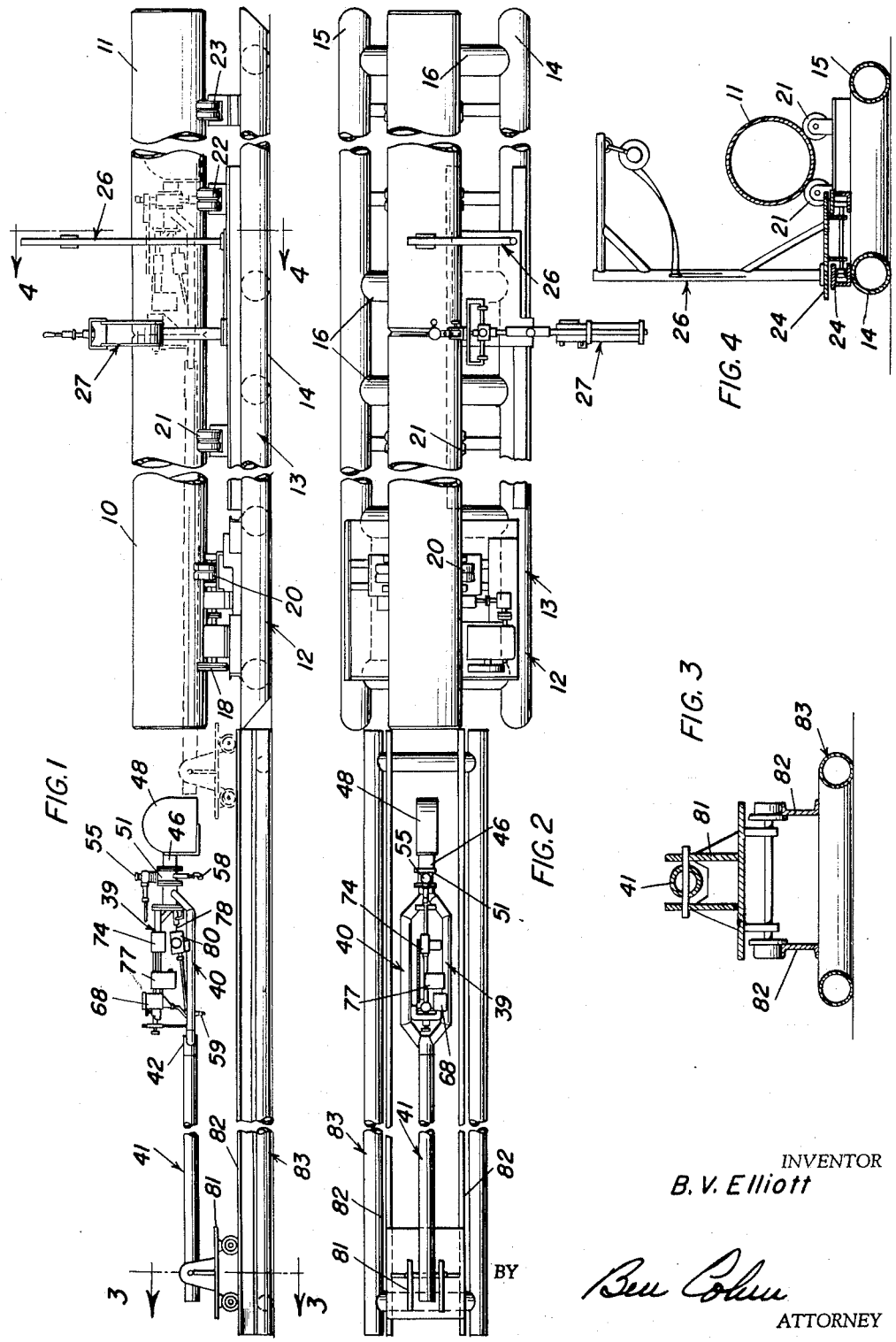
INVENTOR
B. V. Elliott
BY
Ben Cohen
ATTORNEY

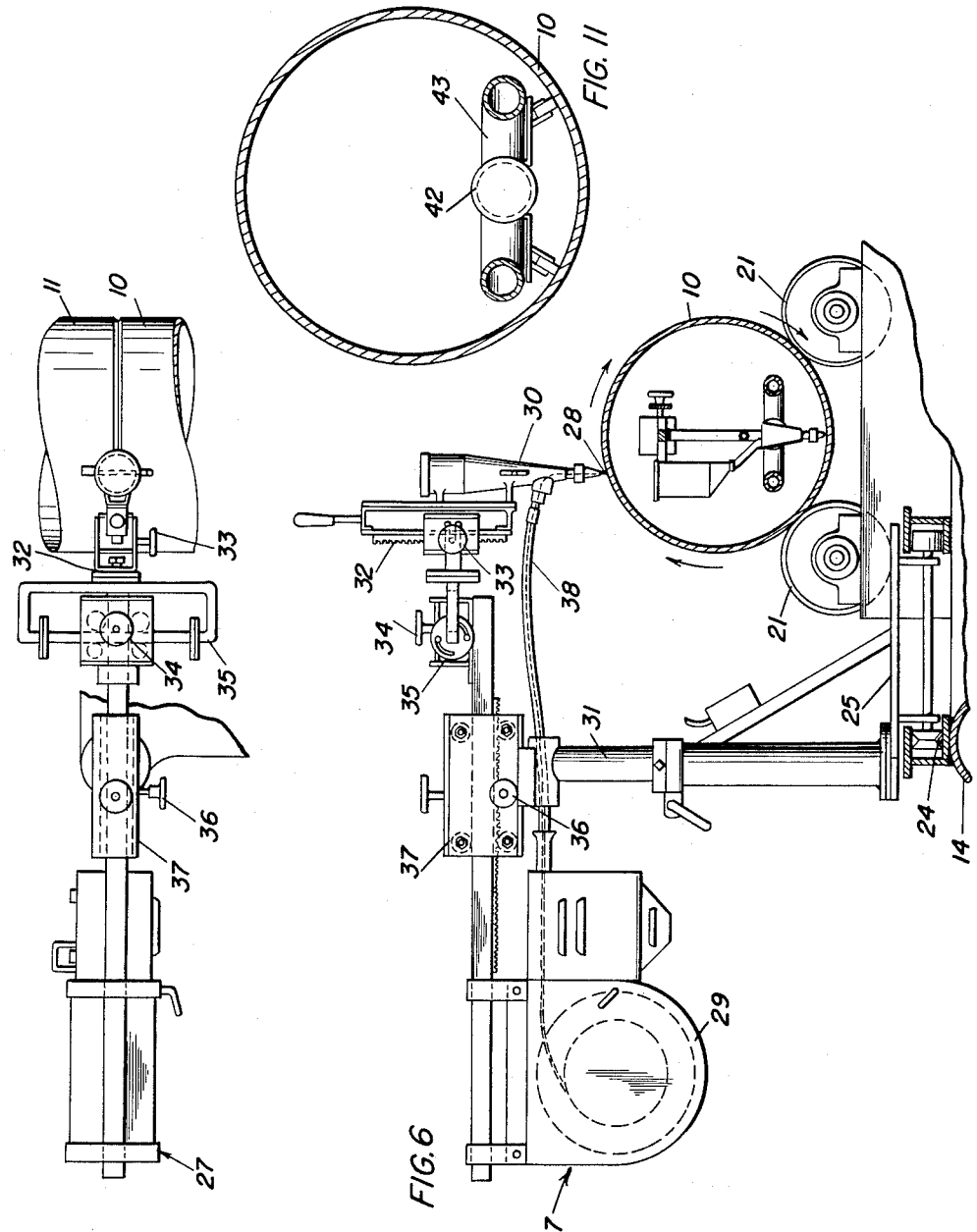

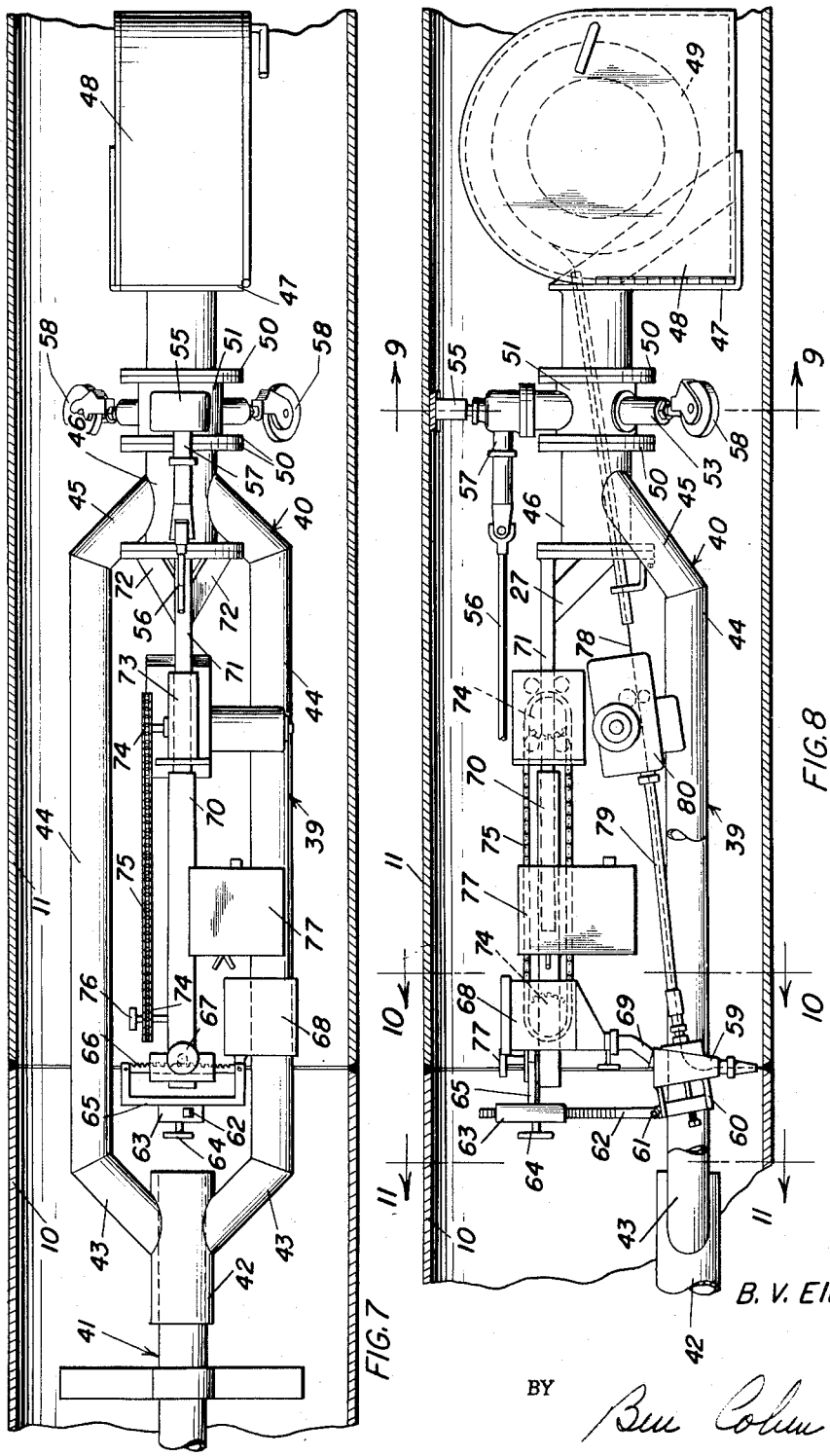

Feb. 6, 1962  B. V. ELLIOTT  3,020,388
AUTOMATIC WELDING MACHINE
Filed Dec. 7, 1956  5 Sheets-Sheet 4

INVENTOR
B. V. Elliott
BY
ATTORNEY

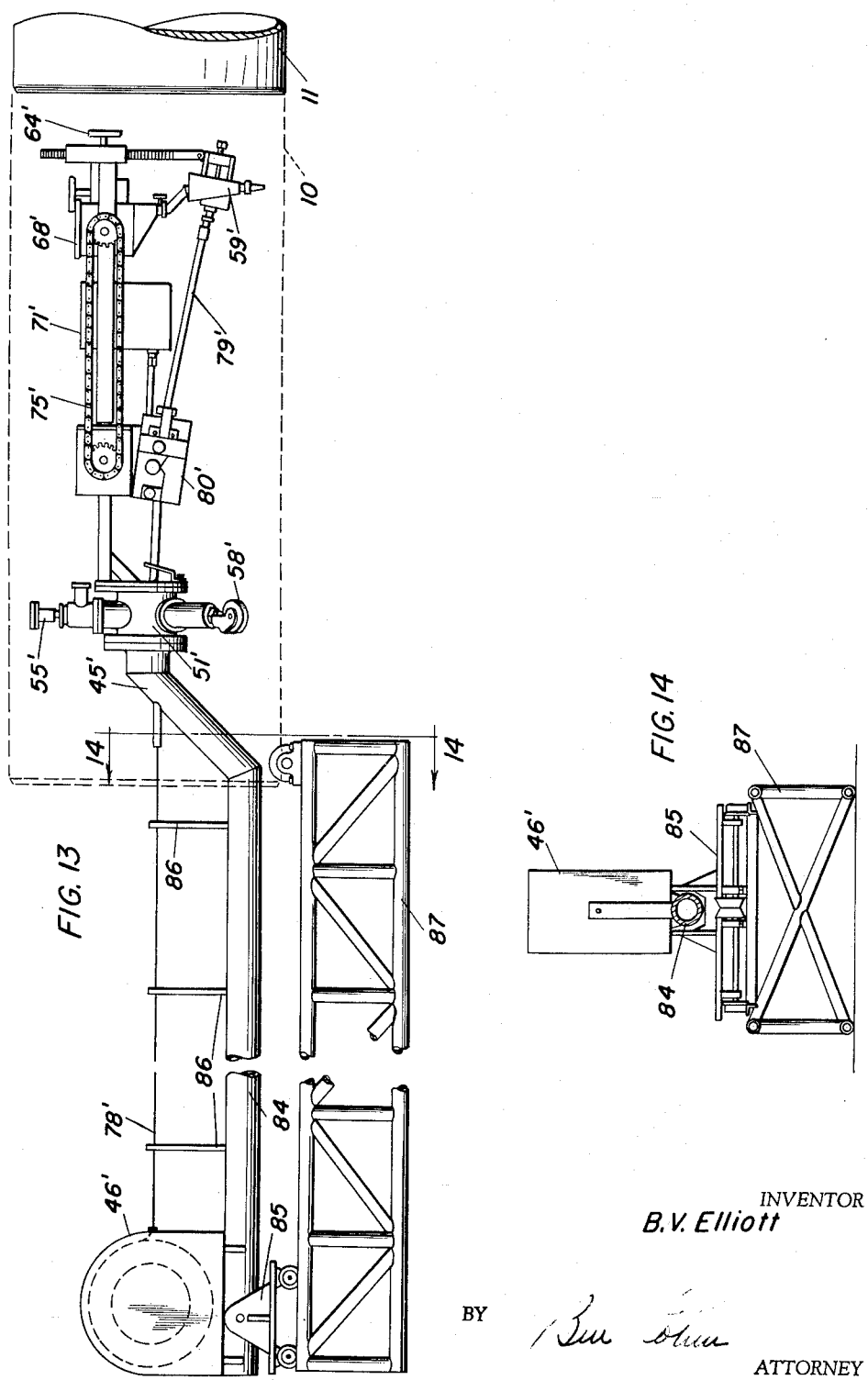

United States Patent Office 3,020,388
Patented Feb. 6, 1962

3,020,388
AUTOMATIC WELDING MACHINE
Bernard V. Elliott, P.O. Box 1111, Bartlesville, Okla.
Filed Dec. 7, 1956, Ser. No. 626,970
10 Claims. (Cl. 219—60)

The present invention relates generally to welding apparatus and more particularly to apparatus for double jointing pipe.

In pipe line construction, it is often desirable to weld together two sections of standard length pipe to provide a double section of pipe and this is commonly known as a double joint. In the prior practice, two sections of pipe to be welded together are positioned on a line-up table which can rotate the pipe, and an inside line-up clamp inserted into the pipe to position the ends to be welded together. An outside welding machine is then used to apply one or more outside beads manually, or an outside automatic welding machine is used to cover and complete the manual weld with one or more passes of automatic weld. If only the outside automatic welder is used to make the outside passes it will not assure sufficient penetration to provide a perfect weld.

Thus, the primary object of the present invention is to provide a double jointed pipe by outside and inside welding operations, both operations being done with automatic apparatus.

A further object of the invention is to provide an improved method of automatically double jointing pipe.

A still further object of the invention is to apply by the automatic submerged arc process, an internal bead calculated to complete the penetration requirements of a code weld.

A still further object of the invention is to provide an improved welding machine for accomplishing an internal bead in a double jointing operation.

Other objects and advantages of the present invention will be apparent from the following description taken in conjunction with the accompanying drawings in which a method of joining pipe in accordance with the present invention is illustrated schematically and in which a pipe welding machine is shown in detail.

Referring to the drawings:

FIGURE 1 is a side elevation of the general arrangement of the welding machines and the two pipe sections to be welded together.

FIGURE 2 is a top plan view of FIGURE 1.

FIGURE 3 is a sectional view taken on the line 3—3 of FIGURE 1.

FIGURE 4 is a sectional view taken on line 4—4 of FIGURE 1.

FIGURE 5 is a top plan view of the outside welding machine.

FIGURE 6 is a side elevation thereof.

FIGURE 7 is a top plan view of the inside welding machine, within the pipe sections.

FIGURE 8 is a side elevation of the inside welding machine within the pipe sections.

FIGURE 11 is a vertical sectional view taken on the line 11—11 of FIGURE 8.

FIGURE 13 is a side elevation of a slightly modified form of inside welding machine, and FIGURE 14 is a vertical sectional view taken on the line 13—13 of FIGURE 12.

Figure 9:
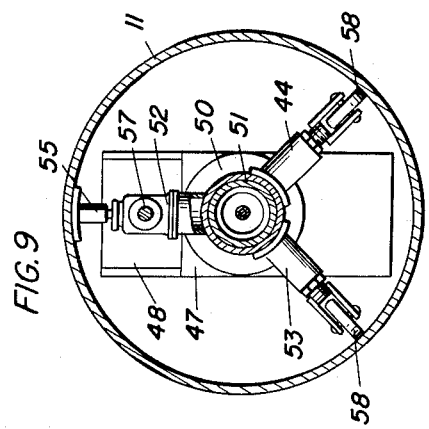
FIGURE 9 is a vertical sectional view taken on the line 9—9 of FIGURE 8.
Figure 10:
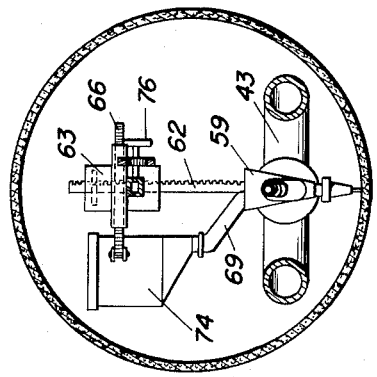
FIGURE 10 is a vertical sectional view taken on the line 10—10 of FIGURE 8.
Figure 12:
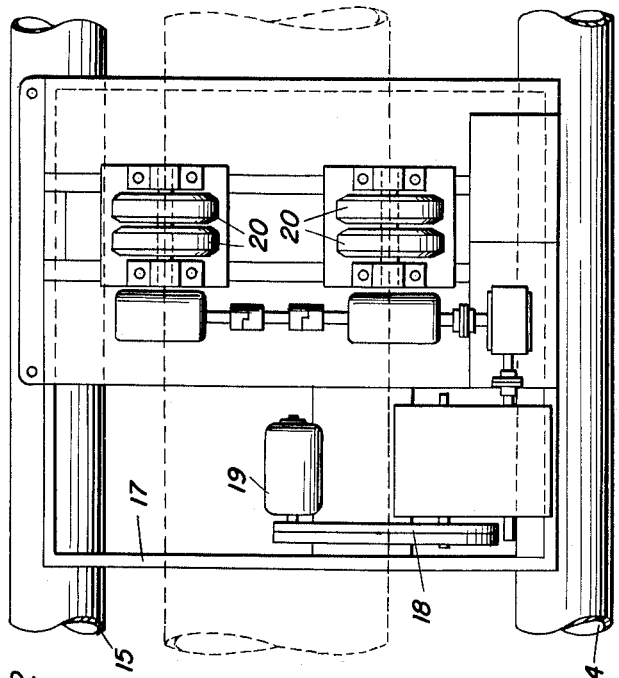
FIGURE 12 is a plan view of the pipe rotating drive rolls.

Referring to the drawings in detail, the two pipe sections to be welded together are indicated by numerals 10 and 11. Means are provided for rotating the two pipe sections and is generally referred to as a line-up table 12. The line-up table disclosed comprises a tubular framework 13 formed of a pair of longitudinal spaced tubes 14, 15 joined by a plurality of spaced transverse tubes 16. A platform 17 is mounted at one end of the framework and supports the driving roller 18 suitably operated by a motor 19. At the center of the platform are idler rolls 20 upon which the pipe section 10 is supported for rotation. Spaced along the framework 13 are additional idler rolls 21, 22 and 23. Approximately mid-way of the tube 14, a rail 24 supports a platform 25 upon which a hoist 26 and the outside welder 27 is mounted.

The outside welder 27, shown in greater detail in FIGURES 5 and 6 comprises generally a welding rod or wire 28 which is automatically fed from a reel in reel housing 29 by means of a suitable welding head 30 to the joint between the pipe ends while the pipe sections 10 and 11 are being rotated. The outside welder is supported on a standard 31 and is provided with various adjustments for correctly positioning the welding head at the proper point at the welding joint. Vertical adjustment is obtained by the rack bar 32 and is controlled by knob 33. Longitudinal adjustment is made by turning knob 34 thereby operating the mechanism indicated by numeral 35, whereas lateral adjustment is controlled by knob 36 which operates mechanism 37. Numeral 38 denotes a flexible tubing through which the welding rod or wire 28 passes.

The inside welder, generally indicated by numeral 39, is shown in detail in FIGURES 7 and 8 and comprises a tubular frame 40 rigidly mounted at the ends of an arbor boom 41. The tubular frame comprises the tubular fitting 42 to which a pair of diverging tubular arms 43 are welded. Welded to these arms are the two longitudinal tubular members 44, and at the opposite ends of these longitudinal members are a pair of upwardly converging tubular arms 45 which are welded to the tubular fitting 46. The opposite end of the tubular fitting 46 supports a platform 47 on which is mounted a reel housing 48 within which a reel 49 is supported.

The tubular fitting 46 is provided with flanges 50, between which a carriage bearing 51 is rotatably mounted. As seen in FIGURE 9, the bearing 51 has affixed thereto a vertical post 52 and a pair of diverging posts 53 and 54 spaced apart approximately 90°. The vertical post threadedly receives a threaded jack member 55 which may be raised or lowered by a rod 56 operating through a suitable gear member 57. Each of the posts 53 and 54 is threaded to receive the wheels 58. The purpose of the bearing 51, jack 55 and carriage wheels will appear as the description proceeds.

The welding head 59 is carried by a bracket 60 to which is pivoted at 61 a vertical rack bar 62 cooperating with a rack 63 for raising or lowering the welding head 59. The knob 64 operates the rack bar 62. The rack 63 is supported on a U-shaped bracket 65, the legs of which are connected by a rack 66 movable in a horizontal plane by a turning knob 67. One leg of the bracket 65 carries the flux hopper 68 which is connected to the welding head through a flexible hose 69.

The bracket 65 is affixed to a tubular bar 70 slidably mounted on a rod 71 secured to the tubular fitting 46 and braced by braces 72. Lateral adjustment is obtained by gear box 73 moving along the rod 71. The gear box is moved through sprockets 74, chain 75 and turning knob 76. Numeral 77 indicates a box mounted on the tubular bar 70 and supports and covers the switches and wiring terminal block. The welding rod or wire 78 is led from the reel 49 through the hollow fitting 46 through the tubing 79 to the welding head 59 by an automatic feed roll device 80.

As seen in FIGURES 1, 2 and 3, the arbor boom 41 is pivotally supported on a carriage 81 movable on rails 82 mounted on the tubular frame 83. The frame 83 and rails 82 are in line with the line-up table 12, and the height of the carriage 81 is such as to maintain the internal welder in proper position to be inserted in the pipe section 10.

In operation, the two sections of pipe to be jointed are positioned on the line-up table 12. A line-up clamp is inserted into the pipe to position the ends to be welded. The outside welder is then positioned over the joint and two beads are run on the outside. The line-up clamp is then removed from the inside of the pipe and the arbor boom conveyed into the pipe joint to welding position. With the inside welder in approximate position within the jointed pipe, as shown in dotted lines in FIGURE 1, the rod 56 is turned thereby forcing the jack 55 into tight engagement with the interior surface of the pipe to prevent longitudinal creep as the pipe rotates around arbor on bearing 51. The welding head 59 is then properly positioned over the joint to be welded by adjustment knobs 64, 67 and 76. The moving rolls for rotating the jointed pipe are then actuated, flux hopper 68 opened and welding of the inside bead started. Only one bead is run on the inside to complete the weld.

In the slightly modified construction of the inside welder shown in FIGURES 13 and 14, the inside welder is in reversed position with the welding head 59' at the leading end of the inside welder, and the reel housing 48' on the opposite end of the welder. The arbor boom 41 of FIGURE 1 is replaced by the tubular supporting structure 84 and the carriage 85 is slightly modified to support the reel housing. The wire or rod 78' is suitably supported in its passage to the welding head 59' by vertical supporting members 86 mounted on support 84. The carriage supporting structure 87 is slightly modified as shown in FIGURE 13. The remaining parts of the inside welder are substantially the same as the corresponding parts of the first form and are so indicated. The operation of this form of the invention is substantially similar to the operation of the inside welder previously described.

Thus it will be seen that the present method and apparatus is well adapted to accomplish the objects and advantages described. It will be appreciated, however, that minor changes may be made in the details of the apparatus shown without departing from the spirit of the invention except as may be required by the appended claims considered with reference to the prior art.

Having thus described the invention, what is claimed is:

1. An internal pipe welding apparatus for joining two pipe sections comprising a carriage, a boom carried by said carriage, means on said boom for gripping the internal surface of one of the pipe sections, remotely controlled means for operating said gripping means for locking the said gripping means to the pipe section, said gripping means being rotatable with respect to said boom, a welding head supported by said boom, means for feeding welding wire to said welding head, and means for longitudinally adjusting said welding head with respect to the gripping means.

2. An internal pipe welding apparatus for joining two pipe sections comprising a carriage, a boom carried by said carriage, means on said boom for gripping the internal surface of one of the pipe sections, remotely controlled means for operating said gripping means for locking the said gripping means to the pipe section, said gripping means being rotatable with respect to said boom, a welding head supported by said boom, means for feeding welding wire to said welding head, and means for adjusting the height of the welding head.

3. An internal pipe welding apparatus for joining two pipe sections comprising a carriage, a boom carried by said carriage, means on said boom for gripping the internal surface of one of the pipe sections, remotely controlled means for operating said gripping means for locking the said gripping means to the pipe section, said gripping means being rotatable with respect to said boom, a welding head supported by said boom, means for feeding welding wire to said welding head, and means for transversely adjusting the welding head.

4. An internal pipe welding apparatus for joining two pipe sections comprising a carriage, a boom carried by said carriage, means on said boom for gripping the internal surface of one of the pipe sections, remotely controlled means for operating said gripping means for locking the said gripping means to the pipe section, said gripping means being rotatable with respect to said boom, a welding head supported by said boom, means for feeding welding wire to said welding head, means for raising and lowering the welding head and means for longitudinally and transversely adjusting the welding head.

5. An internal pipe welding machine for joining two pipe sections comprising a carriage, a boom carried by said carriage, means on said boom for gripping the internal surface of one of the pipe sections, remotely controlled means for operating said gripping means for locking the said gripping means to the pipe section, said gripping means being rotatable with respect to said boom, a welding head supported by said boom, a reel of welding wire supported on said boom, and feeding means between said reel and said welding head for feeding the wire to the welding head.

6. An internal pipe welding machine as defined in claim 5, said reel being supported adjacent the gripping means.

7. An internal pipe welding machine as defined in claim 5, said reel being supported above the carriage.

8. An internal pipe welding machine as defined in claim 7, and means for adjusting the position of the welding head with respect to the joint between the pipe sections.

9. An internal pipe welding apparatus for joining two pipe sections comprising a carriage, a boom carried by said carriage, means on said boom for gripping the internal surface of one of the pipe sections, remotely controlled means for operating said gripping means for locking the said gripping means to the pipe section, said gripping means being rotatable with respect to said boom, a welding head carried by said boom, a flux hopper supported adjacent the welding head, a reel of welding wire supported on said boom, and means for feeding the welding wire to said welding head.

10. An internal pipe welding apparatus as defined in claim 9, and means for adjusting the position of the welding head with respect to the joint between the two pipe sections.

References Cited in the file of this patent

UNITED STATES PATENTS

| | | |
|---|---|---|
| 1,679,499 | Rupley | Aug. 7, 1928 |
| 1,846,470 | Burnish | Feb. 23, 1932 |
| 1,962,297 | Candy | June 12, 1934 |
| 1,972,029 | Norquist | Aug. 28, 1934 |
| 2,260,260 | Mikesh | Oct. 21, 1941 |
| 2,564,396 | Darner | Aug. 14, 1951 |
| 2,655,585 | Braun | Oct. 13, 1953 |
| 2,716,691 | Bowman | Aug. 30, 1955 |
| 2,749,421 | Mikulak et al. | June 5, 1956 |
| 2,837,626 | Buck et al. | June 3, 1958 |